Feb. 10, 1970  M. D. FROST  3,494,548
MACHINE FUNCTION CONFLICT PREVENTING MECHANISM FOR
MATRIX-PIN PROGRAMMABLE BUSINESS MACHINES
Filed Sept. 29, 1967  5 Sheets-Sheet 1

FIG. 1

INVENTOR
MARVIN D. FROST

BY

HIS ATTORNEYS

Feb. 10, 1970　　　　M. D. FROST　　　3,494,548
MACHINE FUNCTION CONFLICT PREVENTING MECHANISM FOR
MATRIX-PIN PROGRAMMABLE BUSINESS MACHINES
Filed Sept. 29, 1967　　　　　　　　　　　　5 Sheets-Sheet 2

INVENTOR
MARVIN D. FROST

BY Louis A. Kline
Wilbert Hawk, Jr.

HIS ATTORNEYS

United States Patent Office 3,494,548
Patented Feb. 10, 1970

3,494,548
MACHINE FUNCTION CONFLICT PREVENTING MECHANISM FOR MATRIX - PIN PROGRAMMABLE BUSINESS MACHINES
Marvin D. Frost, Dayton, Ohio, assignor to The National Cash Register Company, Dayton, Ohio, a corporation of Maryland
Filed Sept. 29, 1967, Ser. No. 671,844
Int. Cl. G06c 29/00, 23/00
U.S. Cl. 235—60
15 Claims

ABSTRACT OF THE DISCLOSURE

A mechanism associated with a business machine programming means of the differentially settable matrix plate and sensing pin penetration of aligned controlling hole type for preventing more than one pin of a selected pair of incompatible-in-function instructing sensing pins from penetrating controlling holes when simultaneously aligned therewith during a machine operation. Control arm members operably interconnected with each pin of the selected pair are normally positioned for presenting one and not then the other thereof effective for penetrating controlling holes when aligned therewith, with an associated selection lever effecting reversal in control arm positioning and hence pin presentation under control of a pair of additional sensing pins when not having aligned controlling holes for penetration thereby.

Background of the invention and cross-reference to related application

With business machines being continually called upon to perform more complex and ever-changing range of accounting functions, it is becoming increasingly more important that cash registers and accounting machines in particular be initially designed with broad program availability to meet the "in-field" and "at-production" variations in requirements thereof, especially with respect to functional operation and keyboard arrangement. With such program availability, cash registers and like machines may in any one class or size follow a standard construction throughout, and yet, as selectively directed through program mechanism of further standard construction employed therein, each perform under control of like-positioned transaction keys totalizer entering and record printing operations unique to itself. As an example, while the differential, totalizer, and printer mechanisms, as well as keyboard arrangement of several machines remain the same, totalizing and printing operations for digit amounts entered into each machine under a like-positioned transaction key may in each instance be drastically different—each following the precise instructions for such transaction key as set up in the program mechanism provided. Programmable control mechanism is thus seen to make available business machines of standard construction, having extreme flexibility in operational functions to meet the precise needs of the user, regardless of his type of business, his particular desires as to keyboard arrangement, and the particular accounting system employed for controlling his business operation.

While any one of several programming means may be employed for cash registers and like machines, one found to be most acceptable to modern day machine construction and considered to provide by far the greatest number of permissible combinations of machine operation (each being considered a different program) makes use of a plurality of matrix plates differentially settable under control of each of the transaction keys provided, each plate containing a predetermined design arrangement (pattern) of machine functional operational controlling holes, and a plurality of sensing pins associated with such controlling holes and effective when extending through aligned ones of such holes for controlling selection and actuation of the various totalizer lines and operation of the various printing mechanisms as contained in the cash register. It is such a matrix plate and pin type programming means to which the present invention relates, insuring that at any one time one and only one sensing pin has controlling effect with respect to each of the particular functional operations designated by the transaction key depressed.

As fully described in the commonly assigned pending application for United States Letters Patent of Louis E. Zurbuchen and Freeland R. Goldammer, Ser. No. 618,598, filed Feb. 27, 1967, now Patent No. 3,431,401 entitled "Programmable Function Control Mechanism for Business Machines" and relating to the form of programming means being herein considered, each bank (vertical row) of transaction keys provided on the cash register or like machine has mounted adjacent thereto a differential mechanism of the type employing primary and secondary rack members. The primary rack member, in the well known manner, becomes positioned upon engaging the stem portion of any key caused to be depressed in such bank, with the secondary rack member thereafter being positioned commensurate therewith; i.e., corresponding to the depressed-key positioning of such primary rack member. As usual, the function of the transaction differential secondary rack member is to control which totalizer lines of the cash register are to be brought into engagement with further differential rack members (amount entry) mounted adjacent the various banks (vertical rows) of amount entry keys provided on the machine, so that the setting of the amount entry differential racks (also primary and secondary) will add into or subtract from the engaged totalizer the particular digit amount represented by the keys selected and depressed in the amount entering banks. Thus, the positioning of the secondary rack member of each transaction bank, among other things, directs which totalizer of the machine is to receive the digit amount set upon the amount entry keys, and whether such amount received therein is to be entered additively or subtractively.

As further disclosed in the aforementioned patent, the directions for such totalizer selection and engagement are uniquely accomplished for any totalizer and transaction key combination through the above-mentioned programming means including the matrix plates and associated sensing pins. For each transaction bank provided on the machine, there is a pair of matrix plates, one or the other of which, under control of the transaction bank secondary rack member, is caused to be shifted and set to a precise position representing the particular key depressed in that transaction bank. With this repeated for each of the transaction banks provided—i.e., one of the matrix plates of the pair therefor being so set according to the particular transaction key depressed—it is seen that, according to the pattern of pin-receiving holes initially provided in each of the matrix plates of the various pairs, thereof, different combinations of so positioning such matrix plates will permit a selected one or ones of the associated sensing pins to be received through aligned holes for dictating the precise machine operation (totalizer selection and engagement, record printing, etc.) to be performed. As clearly illustrated and described, totalizer and printer control mechanisims are actuated at precise times during machine operation for gaining operating instructions from the sensing pin or pins thence protruding through the overall group of matrix plates provided. Such a programming means, it is clear, permits extreme flexibility in overall machine operation, as any change in hole pattern for any matrix plate employed is potentially effective to produce a new and different set of instructions for totalizer selection and printer mechanism operation under control of the particular transaction key or keys caused to be depressed. For the sake of better understanding the magnitude of such programming capability, it can be assumed that each matrix plate provided is of a size to accommodate any desired pattern of function controlling holes within the bounds of some three hundred and seventy-five possible hole locations. While, of course, a relatively small number of such controlling holes (each of a size receiving freely a sensing pin therethrough) only would designate a matrix plate pattern formation at any one time, the variation in hole patterns permissible for each matrix plate times the number of matrix plates employed (two for each transaction bank of the machine (gives an overall program capability far beyond the demands possible relative to machine keyboard arrangement and functional operation.

Summary of the invention

With the provision of such an extensive program capability, it is recognized that in certain isolated instances a conflict in machine functional operation might be encountered upon selection of a certain combination of transaction keys. The conflict itself consists of more than one sensing pin being permitted to reach that position (extending freely through aligned controlling holes) for instructing the machine functional control mechanism to perform conflicting functions during a machine operation. Such conflict problem is more often found in those instances where a broadening of machine programming—i.e., adding more and more controlling holes to the pattern in one or more matrix plates—is required to meet all of the machine users' demands with respect to totalizer operation and keyboard arrangement. In this regard, the demands by machine users for precise totalizer operation and keyboard arrangement occasionally result in a necessary hole pattern for each of the matrix plates provided, which, when arranged one with respect to the other after differential shifting of one or more of such plates under control of precise transaction keys, produces an unwanted alignment of certain totalizer controlling holes along with a desired alignment of certain other totalizer controlling holes. The cause of such a conflict becomes readily understandable when considering the possible build-up of required hole patterns for each of the matrix plates to give the machine user his prescribed needs—in effect permitting an unwanted alignment of matrix plate holes to take place in one instance in order to satisfy in all other instances his precise desires as to totalizer operation. For purposes of the present disclosure, such a conflict might be assumed to be present for instructing a digit amount as set up on the machine keyboard to be entered both additively and subtractively during an ensuing machine operation to a particular totalizer mechanism. While digit amounts may of course be entered both additively and subtractively to such a selected totalizer mechanism, being so done additively during a machine operation by instruction of hole alignment then had through matrix plate positioning under control of a certain one or more transaction keys being depressed, and being so done subtractively during a machine operation by instruction of hole alignment had through matrix plate positioning under control of certain other transaction keys being depressed, all coming within the requirements of overall machine operation as specified by the machine user, further positioning of such matrix plates under control of still other transaction keys has brought into being a condition during a machine operation where hole alignment of the matrix plates permits instructions to be gained for entering such digit amount at that time both additively and subtractively to the selected totalizer. This condition of duo-instructions for totalizer operation (multiple pin projection through aligned matrix plate holes) during a machine operation must of course be prevented from happening in each of those instances during initial machine programming where it has been determined to exist.

It is, therefore, the primary object of the present invention to provide means for preventing a conflict in operational instructions from existing in a matrix plate-pin type programming means for business machines and the like.

More specifically, it is the object of the present invention to provide for a business machine having a program means including a plurality of differentially settable matrix plates, each having a predetermined pattern of machine functional-operation controlling holes therethrough, and a plurality of sensing pins operably associated with such matrix plates and each effective for instructing a precise functional operation to take place during a machine operation whenever permitted to extend through aligned ones of the controlling holes upon matrix plate differential setting, an associated mechanism having sensing pin controlling means effective for preventing, whenever so permitted, due to the particular controlling hole patterns and differential setting of such matrix plates, conflicting instructions from being gained with respect to machine functional operation by multiple pin extension through several sets of thence aligned machine functional-operation controlling holes.

With this and incidental objects in view, the instant invention includes certain novel features of construction and combinations of parts, the essential elements of which are set forth in appended claims and a preferred form or embodiment of which is hereinafter described with reference to the drawings which accompany and form a part of this specification.

Description of the preferred embodiment

As mentioned previously, the particular programming means to which the instant invention relates provides for one matrix plate within the overall group of such plates two plates for each machine transaction bank) to be differentially set to a precise position dictated by each transaction key depressed. With the overall number of matrix plates employed in any one such programming means being of course determined by the number of individual rows or banks of transaction keys provided, in a like manner the number of such plates so caused to be set at any one time depends upon the number of transaction keys within different banks thereof selected and depressed. In each instance, it is this transaction key setting of one or more matrix plates which provides a precise hole arrangement aligned through the overall group of such plates for instructing particular accounting and printing functions to be completed during the ensuing machine operation.

Figure 3:
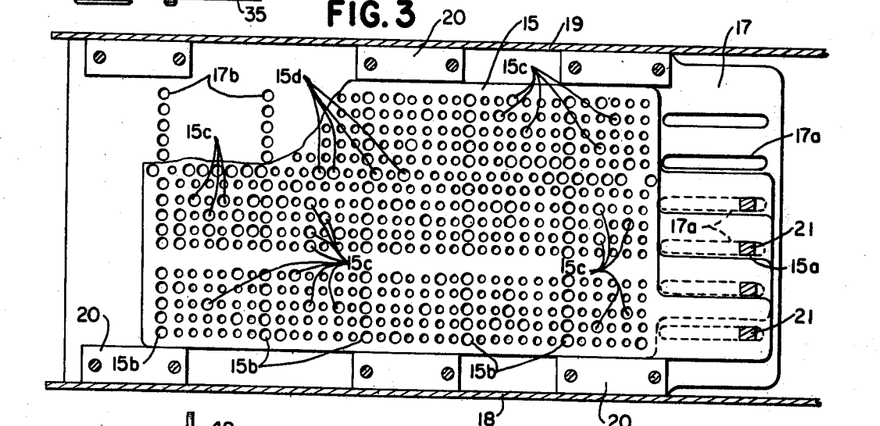
FIG. 3 is a view in section showing the general configuration and arrangement of the various matrix plates employed in the designated programming means, taken along line 3—3 in FIG. 1.

In the manner fully illustrated and described in aforementioned patent the various matrix plates 15 employed in such programming means are located between and mounted for longitudinal shifting movement along upper and lower guide plates 16 and 17 (FIG. 1), which guide plates in turn are supported between right and left side frames 18 and 19 included in the machine totalizer mechanism assembly (FIG. 3). For purposes of the present disclosure, there are four of such matrix plates 15 illustrated, one positioned on top of another and each guided in sliding movement by means of appropriate spacing blocks 20 provided between the several guide plates 16 and 17.

Figure 1:
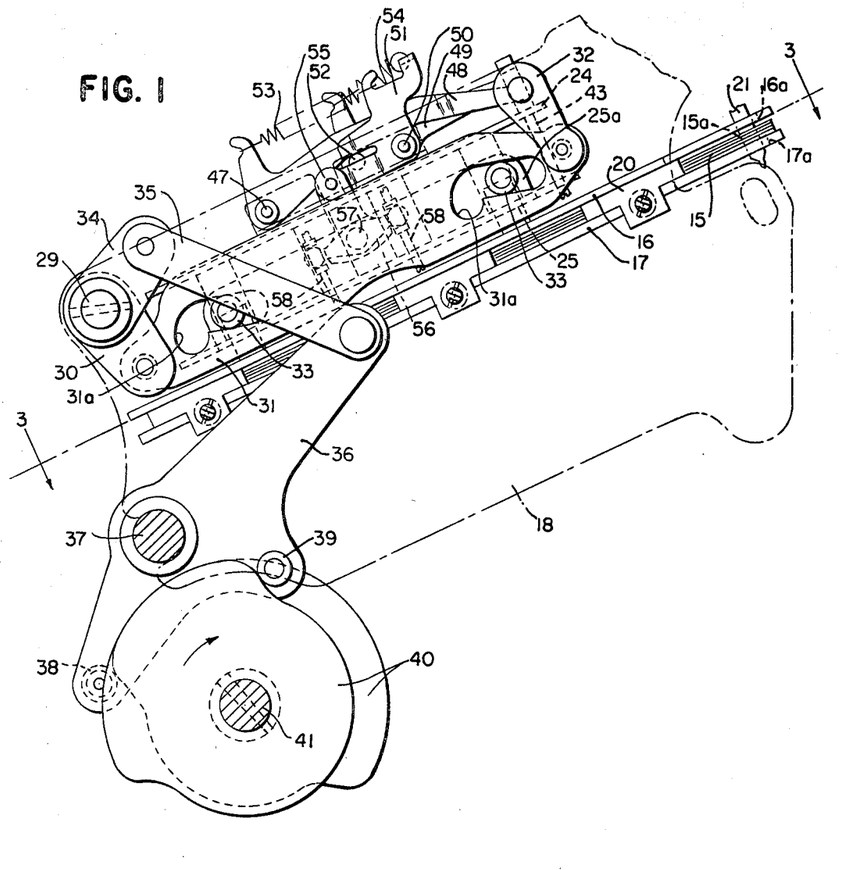
FIG. 1 is a side elevational view of the instant invention as associated with a representative business machine programming means of the matrix plate-pin type.

The precise setting of a selected one or ones of such matrix plates 15 (i.e., shifted with respect to the remaining plates), as per aforementioned patent, takes place at the time the primary and secondary rack members of the machine differential mechanism become actuated to a position commensurate with each transaction key depressed. Although not illustrated herein, in view of the full understanding which may be gained from said co-pending application, a matrix plate positioning mechanism including a gear connected matrix setting rack is actuated to a position corresponding to each transaction key setting of the differential secondary rack member; that is, moved from one position to another under direct control of the associated secondary rack member during machine differential operation. As illustrated in FIGS. 1 and 3, further included in such matrix plate positioning mechanism is a stud 21 carried by each matrix setting rack provided, extending downwardly therefrom and slidingly through a guide slot 16a therefor in the matrix plates upper guide plate 16, into driving engagement through a receiving aperture 15a provided in an operating extension of its associated matrix plate 15, and slidingly through a further guide slot 17a in the matrix plates lower guide plate 17. Such overall arrangement, it is clear, transfer the transaction-key-defined setting of each differential mechanism secondary rack member into a precise positioning of one of its associated matrix plates 15. This, as set out in the above mentioned patent, results in each key being depressed in a transaction bank positioning one of its associated matrix plate 15 in a machine function controlling position, with the other matrix plate 15 for that transaction bank, as well as the remaining matrix plates 15 associated with other transaction banks not having a key depressed therein, remaining in a neutral position.

Figure 4:
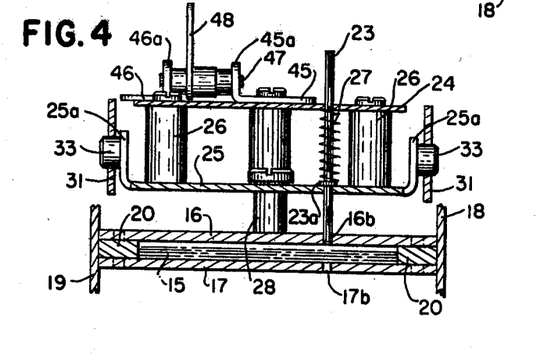
FIG. 4 is a view in section showing the pin cage assembly portion of such programming means as associated with the various matrix plates thereof, taken generally along the line 4—4 in FIG. 2.

As illustrated in FIG. 3, where each of the matrix plates 15 employed for the present disclosure is positioned in its neutral position, certain transverse lines of initially small holes thereof are enlarged, as at 15b, so as to be, at such time, axially aligned with companion lines of like-in-size holes 16b and 17b of the respective upper and lower guide plates 16 and 17 (see also FIG. 4). Between these "neutral" lines of enlarged holes 15b in each matrix plate 15 are machine function control areas of further initially small holes which, depending upon what machine functions are to be performed under control of the associated transaction keys, are selectively enlarged in a predetermined pattern calculated to provide the required machine operation in each instance. In accordance with the number and location of further enlarged holes within such control areas, as represented by holes 15c in FIG. 3, transaction-key-controlled differential positioning of each of the matrix plates 15 continually changes the number and location of the machine function controlling sensing pins which may extend through aligned ones of the enlarged holes 15b and 15c within the overall group of plates 15.

Figure 2:
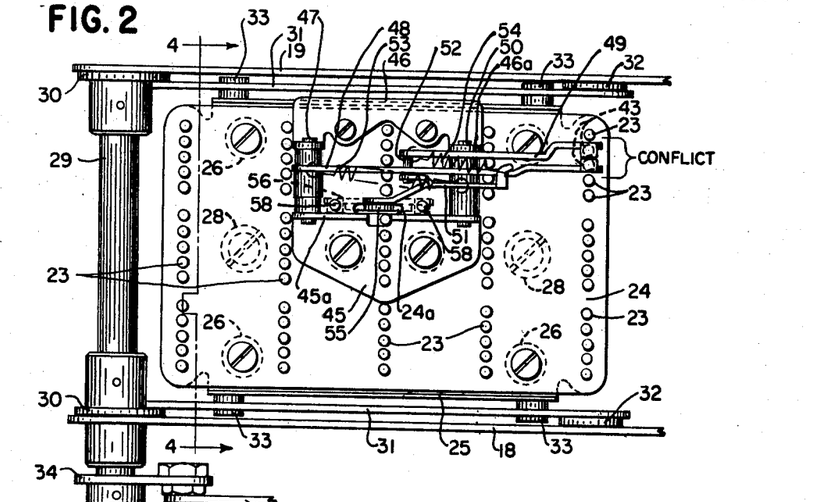
FIG. 2 is a view in top plan showing application and normal positioning of the instant invention with respect to a pin cage assembly portion of the designated programming means.

As illustrated in FIGS. 2 and 4, the function controlling sensing pins, herein designated as pins 23, are included in a pin cage assembly comprising top and bottom plates 24 and 25 interconnected in spaced relationship one to another by a plurality of studs 26. As per FIG. 2, five rows of such pins 23 are provided in the cage assembly, extending through aligned apertures therefor in the several plates 24 and 25. Normal positioning of each pin 23, as seen in FIG. 4, has a shoulder 23a yieldingly maintained in abutment with the cage assembly bottom plate 25 by means of an associated spring member 27.

Mounted on the matrix plates upper guide plate 16 are two guide and positioning studs 28 (FIGS. 2 and 4), which, in being slidingly received through companion apertures provided therefor in the pin cage assembly bottom plate 25, both guide the pin cage assembly during each operation thereof and further present and maintain each of the rows of sensing pins 23 in alignment with companion lines of the further pin receiving holes 16b and 17b of the respective upper and lower guide plates 16 and 17. A pin cage assembly drive shaft 29, rotatably mounted between the right and left side frames 18 and 19 (FIGS. 1 and 2), has affixed thereto a pair of drive arms 30—one adjacent each of said frames 18 and 19 and each pivotally engaging one end of an associated cage drive link 31 extending along upturned side portions 25a of the pin cage assembly bottom plate 25 (see also FIG. 4). As best understood from FIG. 1, each of the drive links 31 is pivotally supported at its other end by an appropriate idler arm 32 rockably mounted on the respective side frames 18 and 19, so that each rocking movement imparted to the drive shaft 29, effects a precise degree of rectilinear movement to the several drive links 31. By means of a driving connection including a pair of precisely developed cam slots 31a in each cage drive link 31 receiving associated pin cage assembly drive studs 33 therewithin—the pair of studs 33 extending outwardly from each upturned side portion 25a of the pin cage assembly bottom plate 25 (FIGS. 1, 2, and 4), such rectilinear movement of the drive links 31 will in turn move the pin cage assembly in a direction perpendicular to the face of the matrix plates 15 therebelow to allow the sensing pins 23 thereof to sense the various holes 15b and 15c in such plates.

A further drive arm 34 is likewise pinned to the pin cage assembly drive shaft 29, on its outermost end portion, (FIG. 2) and pivotally engages one end of an operating link 35 extending therefrom and into further engagement with an associated cage drive cam arm 36 rotatably supported on a stud 37 included with the machine right side frame 18 (see also FIG. 1). Cam-arm-36-carried rollers 38 and 39 engage the respective lead and follow plates of an associated pin cage assembly drive cam 40 secured to the machine transaction cam line 41.

With the machine transaction cam line 41 positioned at home, as illustrated in FIG. 1, the pin cage assembly drive cam 40 thereon effects a like home positioning of the pin cage assembly, where its various sensing pins 23 are each maintained in a matrix-plate-15-non-sensing position (FIG. 4). As the cam line 41 rotates clockwise during start of a machine operation, like turning of said cam 40 thereon, through engagement with the rollers 38 and 39, will first rock the associated cage drive cam arm 36 and hence the pin cage assembly drive shaft 29 an extent counter-clockwise which moves the interconnected cage drive links 31 both upwardly and to the right as viewed in FIG. 1. This, it is clear, positions each of the drive studs 33 of the pin cage assembly within the left end of its associated cam slot 31a of the respective links 31, which is a fully restored, or uppermost, positioning of the pin cage assembly with respect to such matrix plates 15 therebelow. While not precisely illustrated herein, the various sensing pins 23 remain throughout such period of link 31 shifting time free and clear of engagement with the associated matrix plates 15.

Upon completion of approximately one hundred and thirty-five degrees of rotation of the transaction cam line 41, the drive cam 40 thereon becomes effective to impart clockwise rocking to the associated cam arm 36, which, through like rocking thereby of the drive shaft 29, moves the interconnected cage drive links 31 downwardly and to the left, as viewed in FIG. 1. With this happening, each of the cage assembly drive studs 33, in following its cam slot 31a, will move downwardly to lower the overall group of sensing pins 23 to the matrix plate controlling holes sensing position. Of course, those pins 23 which sense at this time an alignment of large holes 15b and 15c through each of the matrix plates 15 will extend freely therethrough and somewhat below the matrix plates lower guide plate 17, whereas those of such pins 23 sensing at this time a small hole (not enlarged as at 15c) in any one of the matrix plates 15 will stop thereat (FIGS. 6 to 10 inclusive). Of course, when a sensing pin 23 is so stopped in penetration through the matrix plates 15 due to large hole non-alignment, further downward movement of the pin cage assembly continues as the shoulder 23a of such stopped pin 23 thereafter compresses the associated spring 27 against the top plate 24 of the cage assembly. The pin cage assembly stays in its lower, machine functional-operation controlling holes sensing position until approximately three hundred and thirty degrees rotation of the machine transaction cam line 41, whereat the cam 40 thereon again returns the associated cam arm 36 to the position shown in FIG. 1. This results in a return rocking counter-clockwise of the pin cage assembly drive shaft 29, to in turn move the cage drive links 31 to the right for positioning the cage assembly drive studs 33 approximately centrally of the cam slots 31a, as shown. The pin cage assembly will, of course, move up at this time, withdrawing the overall group of pins 23 thereof out of sensing engagement with respect to the associated matrix plates 15. Return to normal of those pins not penetrating aligned large holes 15b and 15c will in regular manner be now had by action of the associated springs 27—again being presented, as per FIG. 4, with their shoulders 23a yieldingly abutting the pin cage assembly bottom plate 25.

Figure 5:
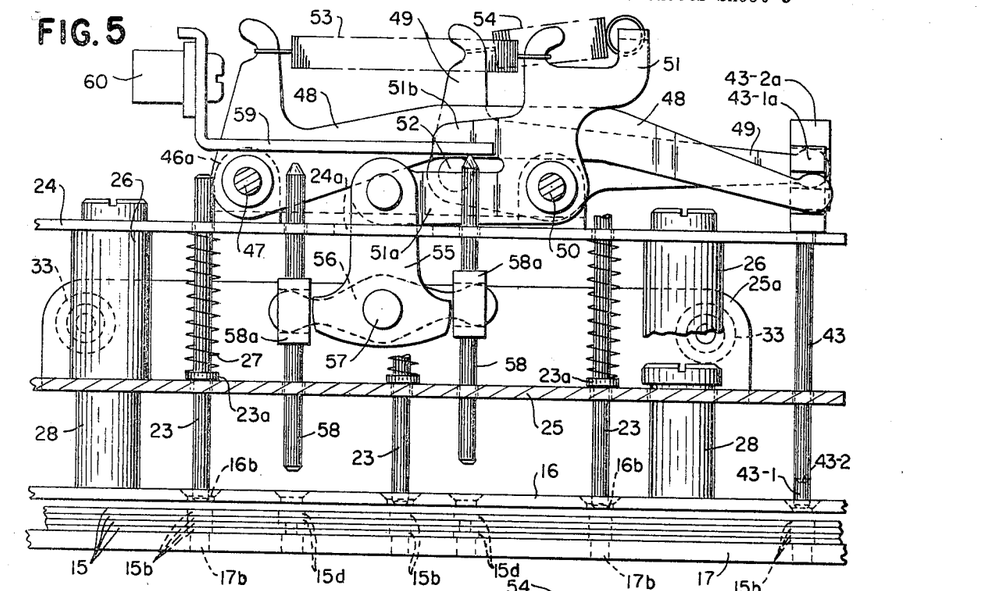
FIG. 5 is an enlarged detail view in side elevation of the instant invention as positioned when the pin cage assembly portion of the designated programming means is at its home, associated matrix plate machine functional-operation controlling holes non-sensing position.

Recalling now the previous discussion relating to conflicting machine functional operation which might be encountered in isolated instances due to the selection of a certain combination of transaction keys. it is seen that the precise pattern of large holes 15c as provided in each of the matrix plates 15 (FIG. 3) it might very well be so coordinated through machine differential operation as to permit more than one sensing pin 23 to reach that position during the just-described downward shifting operation of the pin cage assembly—i.e., extending freely through aligned holes 15b, 15c and projecting somewhat below the lower guide plate 17 (FIGS. 6 to 10 inclusive)—for instructing the machine functional control mechanism to perform several functions which are in direct conflict one with another whenever taking place during the same machine operation. For purposes of the present disclosure, such a condition of unwanted duo-instructions hase been determined to exist at the several adjacent sensing pin 23 locations designated as "conflict" in FIG. 2. This particular conflict, as hereinabove assumed, results in the condition during those instances when the several sensing pins so located are permitted to penetrate the matrix plates 15 of instructing a digit amount as then set up on the machine keyboard to be entered both additively and subtractively to a selected totalizer mechanism. This, of course, cannot be done, as one or the other only of such conflict-in-function instructing sensing pins must be given controlling authority throughout any one machine operation.

Where such a conflict is determined to exist, the usual sensing pins 23 thereat are removed from the overall pin cage assembly and replaced by what might be generally designated conflict control sensing pins 43 (FIG. 2). Each of such sensing pins 43, as further illustrated in FIG. 5, is of a length equalling approximately that of the sensing pins 23, and is of a design including an upper head portion positioned on the outer side of the pin cage assembly top plate 24. In keeping with the precise conflict assumed to exist for purposes of the present disclosure, and for the sake of insuring clarity of understanding overall operation of the instant invention, the frontmost one of such conflict control sensing pins 43 (FIG. 5) is hereafter understood as being specifically add control pin 43–1, issuing instructions when permitted to penetrate the matrix plates 15 for entering a keyboard-designated digit amount additively to the particular totalizer mechanism then selected, with the remaining one of the pins 43 likewise understood as being specifically subtract control pin 43–2 and issuing instructions when permitted to penetrate the matrix plates 15 for entering a keyboard-designated digit amount subtractively to the particular totalizer mechanism then selected. Thus, is in the case for each of the sensing pins 23 provided, each of the now-present add and subtract control pins 43–1 and 43–2, when permitted to reach full penetration with respect to the associated matrix plates 15, issues instructions for a precise functional operation to be carried out during the ensuing machine operation.

Looking again to FIG. 2, affixed, as by screws or the like, to the upper surface of the pin cage assembly top plate 24 are front and rear mounting brackets 45 and 46, spaced a selected distance one from the other and having upturned inner ear portions 45a and 46a, respectively (see also FIG. 4). A left shaft member 47, extending between the mounting bracket ear portions 45a and 46a, rotatably supports one end of an add control arm 48 positioned approximately centrally of the several mounting brackets 45, 46 and extending rightwardly and therebeyond to have its other end operably engage the upper head portion of the add control pin 43–1, designated specifically as head portion 43–1a in FIG. 5. As illustrated in FIG. 5, such other end of the add control arm 48 is received slidingly within a slotted zone of said head portion 43–1a, so as to impart upward shifting movement to the add control pin 43–1 during each counter-clockwise rocking of the add control arm 48 and, in a like manner, impart downward shifting movement to the add control pin 43–1 during each clockwise rocking of the control arm 48. A subtract control arm 49, supported rotatably ta one end by a right shaft member 50 extending between the mounting brackets 45 and 46 (FIG. 2), likewise extends rightwardly and therebeyond to have its other end operably engage the upper head portion of the subtract control pin 43–2, desigated specificaly as head portion 43–2a in FIG. 5. The positioning of the subtract control arm 49, as shown in FIG. 2, is adjacent the mounting bracket 46, and is again so interconnected slidingly (end portion within slotted zone) with the head portion 43–2a as to impart upward and downward shifting movements to the subtract control pin 43–2 upon respective counter-clockwise and clockwise rocking thereof.

Also mounted rotatably on the right shaft 50, at a zone adjacent the front mounting bracket 45 (FIG. 2), is a control arm selection lever 51. As so positioned (FIG. 5), the overall configuration of the selection lever 51 is such as to present a leftwardly-extending lower arm portion 51a thereof adjacent the upper surface of the pin cage assembly top plate 24, with an intermediate shoulder portion 51b thereof aligned over and in operating engagement with the end of a forward stud 52 on the subtract control arm 49 extending below and likewise in operating engagement with the add control arm 48. A spring 53, stretched between companion ear portions of the selection lever 51 and the add control arm 48, yieldingly urges the several members 51 and 48 counter-clockwise and clockwise, respectively—where, as per FIG. 5, the lever 51 is normally positioned within its lower arm 51a presented in abutment with the upper surface of the pin cage assembly top plate 24 and the arm 48 is normally positioned to have the interconnected add control pin 43–1 maintained downwardly with its upper head portion 43-1a likewise in abutment with the upper surface of the plate 24. At the same time, through the shoulder 51b of the selection lever 51 acting against the associated stud 52, such normal positioning of the lever 51 likewise presents the subtract control arm 49 normally counter-clockwise and to a position for then maintaining the interconnected subtract control pin 43-2 upwardly, with its upper head portion 43-2a spaced a precise distance above the upper surface of the pin cage assembly top plate 24.

Extending between further companion ear portions of the selection lever 51 and the subtract control arm 49 is a yieldable link 54, herein illustrated in the form of a strong spring (FIGS. 2 and 5). Through such link 54, as understood from FIG. 5 any clockwise rocking of the selection lever 51 from its normal, spring-53-urged, position is transferred immediately and directly to the subtract control arm 49, to in turn effect a downward shifting of the subtract control pin 43-2 until its upper head portion 43-2a comes into abutment with the upper surface of the pin cage assembly top plate 24. Simultaneously therewith, through the arm-49-carried stud 52 operating against the under surface of the add control arm 48, automatic counter-clockwise rocking of the arm 48 likewise takes place for moving, at such time, the add control pin 43-1 upwardly and to a position where its upper head portion 43-1a becomes now spaced a distance above the upper surface of the top plate 24.

Essentially, through the arrangement of conflict mechanism thus far described, normal positioning of the selection lever 51 and the add control arm 48 under urgence of the spring 53 is seen to present the several conflict control sensing pins 43-1 and 43-2 in lower and upper positions, respectively, with respect to the overall pin cage assembly employed, with an automatic reversal of such pins 43-1 and 43-2 to upper and lower positions, respectively, taking place by link 54 rocking of the subtract control arm 49 and the stud 52 rocking of the add control arm 48 upon each movement of the selection lever 51 from its normal position. Modification in mechanism arrangement may, of course, be had without affecting such a desired normal and reversal in positioning of the several sensing pins 43-1 and 43-2. In this regard, while the selection lever shoulder portion 51b and stud 52 arrangement has been described above as the preferred means for presenting the subtract control arm 49 normally counter-clockwise, whereby the interconnected sensing pin 43-2 is normally maintained upwardly, it is clear that, as so arranged (FIG. 5), either the control-arm-49-carried stud 52 itself (through engagement with the under surface of the add control arm 48) or the link 54 itself (through direct connection with the subtract control arm 49) may likewise be employed for such purpose and the need for the shoulder portion 51b of the selection lever 51 thus eliminated.

Pivoted to the lower arm 51a of the control arm selection lever 51, and depending freely through an aperture 24a in the pin cage assembly top plate 24, is a bell-shaped actuating arm 55, the lower end of which terminates approximately centrally of the spacing between the several such top and bottom plates 24 and 25 of the pin cage assembly (FIG. 5). A yoke arm 56, centrally pivoted at 57 on the lower end of the actuating arm 55 and extending with free end portions outwardly therebeyond, operably engages a pair of companion sensing pins 58 mounted for upward and downward shifting movement within further aligned apertures provided through the pin cage assembly top and bottom plates 24 and 25. The precise configuration of each of the pins 58 again makes use of a slotted zone thereof slidingly interconnecting the associated end portion of the yoke arm 56, but so provided within a central body portion 58a thereof rather than within any upper head portion, as was described with respect to the several control pins 43-1 and 43-2. Such overall arrangement of the actuating arm 55 and yoke arm 56, as illustrated in FIG. 5, effects an approximate balance of the several pins 58 whenever the pin cage assembly is at its home, or upper, position; that is, both pins 58 being disposed in a near even elevation with respect to the several plates 24 and 25.

While either one or both of such companion sensing pins 58 may of course likewise have aligned holes therebelow upon differential shifting of the various matrix plates 15 employed, the positioning of the pins 58 within the overall pin cage assembly (FIG. 2) is such as to remove each of them from alignment with the five regular rows of machine function controlling sensing pins 23. Hence, as so positioned, neither of the companion sensing pins 58 is available during pin cage assembly operation (downward shifting thereof) for penetrating either of the earlier-described pin-receiving holes 15b or 15c of the matrix plates 15, but rather must rely for matrix plate penetration at such time on the alignment therewith of additional pin-receiving holes 15d provided therefor and arranged likewise in selected patterns through the matrix plates 15 (FIGS. 3 and 5). That is, like the pattern of enlarged holes 15c as presented in each matrix plate 15 for association with the sensing pins 23 (FIG. 3), such additional enlarged holes 15d associated with the pins 58 are arranged in a predetermined pattern calculated to define precise pin 58 penetration of the matrix plates 15 according to each differential setting thereof.

As has now been described in association with the mounting brackets 45 and 46, the overall conflict mechanism making up the present invention (FIGS. 1, 2, 4, and 5) will of course move in concert with the pin cage assembly. Furthermore, in keeping with the object of the present invention and recalling the precise conflict herein assumed for purposes of the instant disclosure thereof, differential positioning of the matrix plates 15 will at times have set up a conflict to machine functional operation where, along with the planned penetration of such matrix plates by precise ones of the sensing pins 23, both of the totalizer mechanism add control pin 43-1 and subtract control pin 43-2 will also have a combination of matrix plate holes 15b and 15c aligned therebelow. The companion sensing pins 58, alone or together, may or may not have an arrangement of the additional matrix plate holes 15d aligned therebelow at such times, all depending upon the precise pattern of such associated holes 15d as provided in each of the matrix plates provided.

Figure 6:
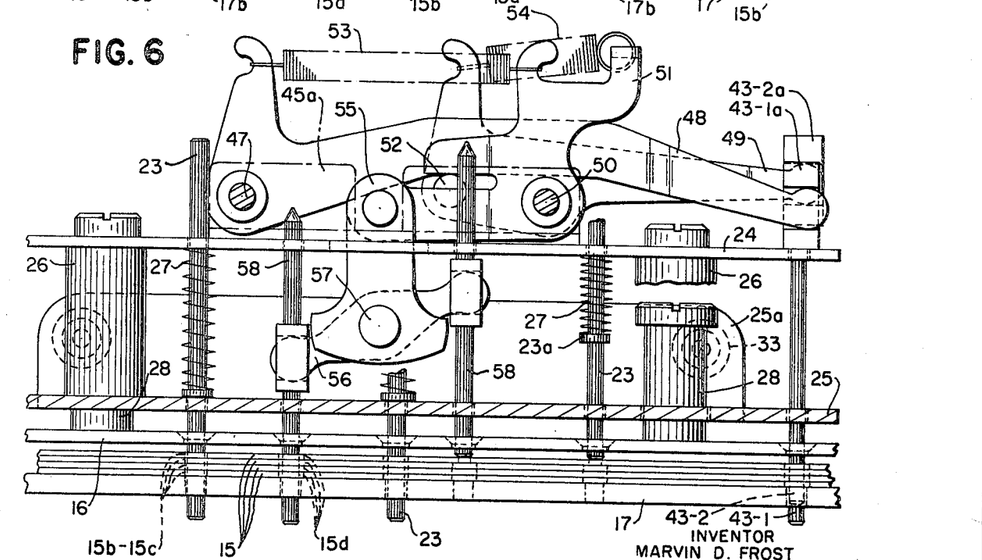
FIGS. 6 through 10 are further detail views similar to FIG. 5, but showing the invention as operated to various of its permitted positions for effecting sensing pin control upon such pin cage assembly portion of the programming means being shifted to its matrix plate controlling holes sensing position.

Looking to FIG. 6, there is shown a condition where differential positioning of the various matrix plates 15 has presented, along with such a conflict existing between the several control pins 43-1 and 43-2 (aligned grouping of holes 15b and 15c therebelow), the left-hand one only of the companion sensing pins 58 with an arrangement of holes 15d aligned therebelow. At such time, as is operationally illustrated, downward shifting of the pin cage assembly during machine operation will cause the yoke arm 56 to commence rocking counter-clockwise on the actuating arm 55 as the right-hand sensing pin 58 becomes stopped in downward movement by the first one of the matrix plates 15 not having a hole 15d aligned therewith, which in turn permits the left-hand such sensing pin 58, without appreciable movement to such actuating arm 55, to move freely downwardly and through the holes 15d as aligned therebelow. This, in turn, enables the spring 53 to maintain selection lever 51 in its normal position throughout the downward shifting movement of the pin cage assembly, with the result that, although matrix plate hole alignment is present for both the add and subtract control pins 43-1 and 43-2, the add pin only (43-1) will be permitted to reach a machine functional-operation instructing position at such time. Hence, under such a condition where the right-hand sensing pin 58 is stopped in penetration and the left-hand sensing pin 58 fully penetrates the matrix plates 15 provided, it is seen that the digit amount as thence set up on the machine keyboard will be entered additively to the particular totalizer mechanism so selected for receiving it.

Return of the pin cage assembly upwardly and to home position during machine operation will of course free the companion sensing pins 58 for again assuming their normally balanced condition, as seen in FIG. 5. In this regard, a restoring bracket 59, secured to the machine framework 60, coacts with the upper extremity of the matrix plate non-penetrating pin 58 to impart reverse rocking of the yoke arm 56 until an approximately central balancing thereof has been achieved.

Figure 7:
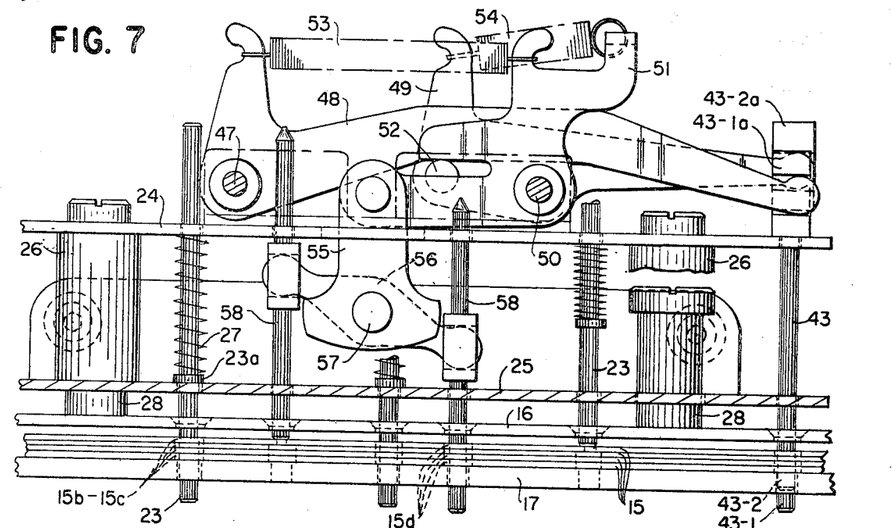

A condition reverse to that of FIG. 6 is illustrated in FIG. 7, where differential positioning of the matrix plates 15 has presented hole 15d arrangements causing, during downward shifting of the pin cage assembly, the left-hand sensing pin 58 to be stopped in penetration and permitting the right-hand sensing pin 58 to extend freely through the plates 15. At this time, as is so illustrated, clockwise rocking of the yoke arm 56 will be had without movement of the actuating arm 55—hence again permitting the spring 53 to maintain the selection lever 51 in its normal position to call for the add control pin 43-1 only to reach a machine functional-operation controlling position. That is, as was the case in the condition illustrated in FIG. 6, the keyboard-designated digit amount is again caused to be entered additively in the particular totalizer mechanism selected.

Figure 8:
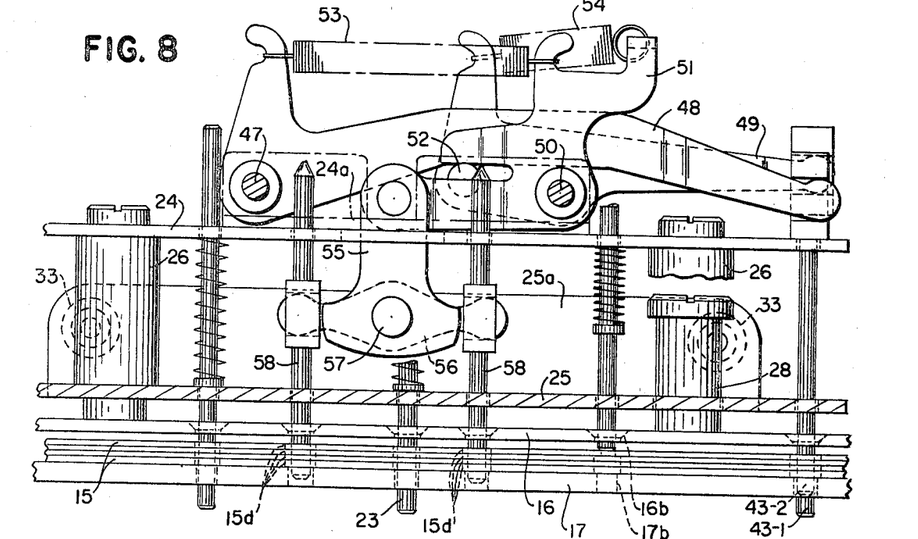

A further condition which may arise through the differential setting of the matrix plates 15 is that illustrated in FIG. 8, where the companion sensing pins 58 are both permitted to penetrate aligned holes 15d during downward shifting of the pin cage assembly. In this instance, the associated actuating arm 55 again moves freely downwardly with the pin cage assembly, permitting the spring 53 to maintain the selection lever 51 in its normal position during machine operation and hence likewise call for an add entry of the keyboard-designated digit amount under instruction of the add control pin 43-1.

Figure 9:
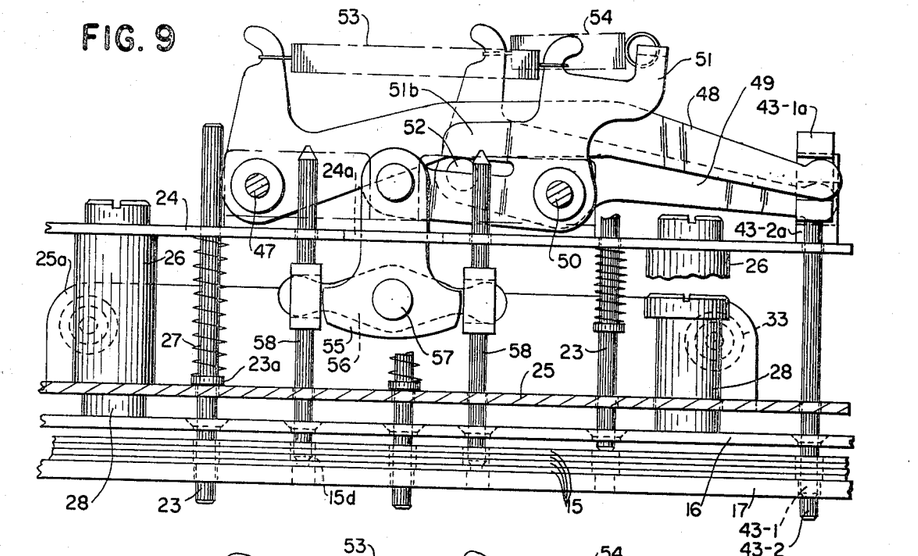

On the other hand, as illustrated in FIG. 9, differential setting of the matrix plates 15 may at times provide no alignment of holes 15d with respect to the several sensing pins 58. Under such condition, where neither of the companion pins 58 is permitted to penetrate completely the associated matrix plate 15 as so positioned, downward shifting of the pin cage assembly, through the now fixed positioning of the pivot 57 by the matrix plate engaging pins 58 and hence likewise restraint in downward travel of the actuating arm 55 during pin cage assembly movement, overcomes the normal urgency of the spring 53 and imparts a precise degree of clockwise rocking movement to the control arm selection lever 51. That is, with the several pins 58 holding the actuating arm 55 against full downward travel with the pin cage assembly, rocking from normal of the interconnected selection lever 51 will regularly take place at such time. This, in turn, transfers the positioning of the add and subtract control arms 48 and 49 to control of the yieldable link 54, which, as illustrated, causes simultaneous and like clockwise rocking of the subtract control arm 49 with the selection lever 51 and, through upward movement of such control arm carried stud member 52 thereduring, further causes simultaneous counter-clockwise rocking of the add control arm 48. The result of course is a reverse in positioning of the machine function conflict control pins 43, presenting the subtract control pin 43-2 downwardly with its upper head portion 43-2a abutting the upper surface of the pin cage assembly top plate 24 and presenting the add control pin 43-1 upwardly with its upper head portion 43-1a maintained a distance thereabove. Under such condition, where the subtract control pin 43-2 is now permitted to penetrate the matrix plates 15 and hence reach its instructing position with respect to the associated machine functional-operation control mechanism provided, the keyboard designated digit amount is in regular manner caused to be subtracted from the particular totalizer mechanism then selected. Return of the pin cage assembly upwardly and to home will, of course, again return the positioning of the several control arms 48 and 49 to control of the spring 53, effecting counter-clockwise rocking of the selection lever 51 to normal abutment with the pin cage assembly top plate 24 (lower arm 51a thereof as seen in FIG. 5) and hence, in the manner described earlier with respect to FIG. 5, restoring the several control control arms 48 and 49 to their respective clockwise and counterclockwise rocked positions. This, as illustrated, repositions the interconnected conflict control pins 43 to normal; that is, moves the upper head portion 43-1a of the add control pin 43-1 downwardly to abutment and the upper head portion 43-2a of the subtract control pin 43-2 upwardly from abutment with respect to the upper surface of the pin cage assembly top plate 24.

With the noted conflict in machine functional operation recognized as existing in certain isolated instances only, it is clear that the great majority of machine operations are under control of transaction key selection not presenting a conflict with respect to digit entering (add or subtract) to the particular totalizer mechanism selected. Hence, at such times where one and only one of the add and subtract control pins 43-1 and 43-2 has aligned holes 15b and 15c therebelow upon differential positioning of the various matrix plates 15, the overall conflict control mechanism hereof must be of a nature to yield when and where necessary to attain each of the precise amount entry functions desired and thus, through matrix plate pin pattern arrangement employed, programmed for the particular machine in question. Of course, should differential setting of the matrix plates 15 align holes 15b and 15c only for the add control pin 43-1, with one or the other or both of the companion sensing pins 58 likewise free to penetrate further aligned holes 15d therebelow, downward shifting of the pin cage assembly will result in conflict mechanism operation substantially the same as previously described with respect to FIGS. 6, 7, and 8. That is, no movement from normal positioning of the control arm selection lever 51 will take place at such time, and the add control pin 43-1 is maintained in its normal position (downwardly) for then penetrating aligned holes therebelow. Slight counter-clockwise rocking of the subtract control arm 49 is of course permitted at this time through yield of the strong spring 54 upon matrix plate 15 stoppage in downward movement of the subtract control pin 43-2 during pin cage operation. This, of course, is an idle movement only of the arm 49 and has no effect whatsoever on the remaining elements including in the conflict mechanism construction. As was the case in the previously-described conflict conditions, where selection of the add control pin 43-1 for instructing the associated machine functional-operation control mechanism resulted from the precise pattern arrangement of matrix plate holes 15d permitting matrix plate penetration by one or both of the companion pins 58 and hence unobstructed downward shifting of the bell-shaped actuating arm 55 with the pin cage assembly (FIGS. 6, 7, and 8), the present operation of the add control pin 43-1 under a no-conflict condition again employs a pattern arrangement of matrix plate holes 15d precisely calculated with respect to the companion sensing pins 58 so as to likewise permit freedom in downward movement of the actuating arm 55 with the pin cage assembly.

Figure 10:
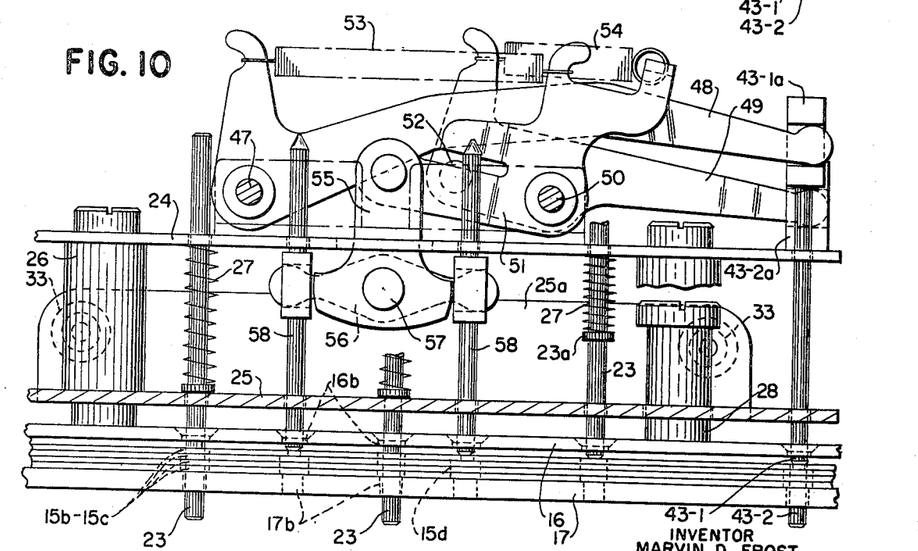

On the other hand, should differential positioning of the matrix plates 15 align holes 15b and 15c only for the subtract control pin 43-2, with neither of the companion sensing pins 58 free to penetrate associated holes 15d therebelow, downward shifting of the pin cage assembly results in conflict mechanism operation substantially the same as previously described with respect to FIG. 9. That is, through pin 58 stoppage in downward movement of the bell-shaped actuating arm 55, rocking from normal of the control arm selection lever 51 takes place for shifting the subtract control pin 43-2 downwardly and into position for penetrating the aligned holes therebelow. While automatic transfer movement upwardly of the add control pin 43-1 likewise takes place at this time (FIG. 9), a slight degree of further counter-clockwise rocking of the add control arm 48 will, of course, take place upon matrix plate engagement by the add control pin 43-1 during downward movement thereof with the pin cage assembly. This, as illustrated in FIG. 10, is permitted through yield of the spring 53 and again results in an idle movement only of the arm 48, with no effect whatsoever on the remaining elements including in the conflict mechanism construction. Contrary to a designated pattern of matrix plate holes 15d permitting one or both of the companion sensing pins 58 to penetrate the various matrix plates 15 as differentially set therebelow, as is the case for all machine operations in which digit amounts are to be entered additively to the particular totalizer mechanism selected, the pattern of matrix plate holes 15d cooperating with such companion sensing pins 58 is seen to be now precisely calculated so as to prevent any penetration of the matrix plates 15 thereby during this further no-conflict condition of digit amount entry subtractively to the machine totalizer mechanism selected.

From the foregoing description of mechanism and operation of the instant invention, it is seen that it is extremely effective in preventing a conflict of operational instructions from existing in a matrix plate-pin type of programming means for business and like machines. Furthermore, while such description has, for the sake of convenience, been herein related to a conflict in operational instructions assumed to exist in the amount entry function of the representative business machine, it is to be understood that the invention per se is of the nature permitting simple application thereof with respect to the programming means for overcoming any and all conflicts determined to exist within the overall functional operation requirements of the business machine in question. Thus, while the form of mechanism shown and described herein is admirably adapted to fulfill the objects stated, it is to be understood that the invention is susceptible of embodiment in various forms without departing from the spirit of the invention.

What is claimed is:

1. In combination with a business machine having functional operation programming means of the type including a plurality of differentially settable matrix plates, each having a predetermined pattern of function controlling holes therethrough, and a plurality of sensing pins operably associated with said matrix plates and each effective for instructing a precise function to take place during a machine operation when penetrating aligned ones of the controlling holes upon matrix plate differential setting; control mechanism operably associated with said sensing pins for preventing conflicting instructions from being gained with respect to machine functional operation whenever, due to the particular controlling hole patterns and differential settings of said matrix plates, controlling holes are caused to become aligned during a machine operation with a pair of sensing pins instructing for functions which are incompatible one with another when performed during the same machine operation.

2. The combination of claim 1 in which said control mechanism selects one or the other sensing pin of said pair of function instruction sensing pins for penetration of its aligned controlling holes according to further sensing pin penetration of controlling holes as thence aligned therewith.

3. The combination of claim 2 in which said control mechanism includes a predetermined pattern of additional controlling holes through each of said matrix plates; a pair of additional sensing pins operably associated with said matrix plates and arranged for penetration of said additional controlling holes when aligned therewith; a pair of control arms, one operably interconnected with each sensing pin of said pair of function instructing sensing pins; means normally positioning each of said control arms for presenting one sensing pin of said pair of function instructing sensing pins effective and the other sensing pin of said pair of function instructing sensing pins ineffective for penetrating controlling holes aligned therewith; and means under control of said additional sensing pins for reversing the positioning of each of said control arms and hence interconnected function instructing sensing pin presentation whenever, due to the particular additional controlling hole patterns, neither of said additional sensing pins has aligned ones of the additional controlling holes for penetration thereby.

4. The combination of claim 3 in which said positioning means maintains normal positioning of each of said control arms whenever, due to the particular additional controlling hole patterns, one or the other or both of said additional sensing pins has aligned ones of the additional controlling holes for penetration thereby.

5. In combination with a business machine having functional operation programming means of the type including a plurality of differentially settable matrix plates, each having a predetermined pattern of function controlling holes therethrough, and a plurality of sensing pins operably associated with said matrix plates and each effective for instructing a precise function to take place during a machine operation when penetrating aligned ones of the controlling holes upon matrix plate differential setting; mechanism for preventing more than one sensing pin of a selected pair of said sensing pins from issuing function instructions when controlling holes are concurrently aligned therewith during a machine operation, comprising control arm means operably interconnecting each of the sensing pins of the selected pair thereof; lever means operably interconnecting said control arm means and positionable to either of two positions, each effective to position said control arm means for presenting a different one and not then the other of said selected pair of sensing pins effective for penetrating controlling holes aligned therewith; and actuating means for dictating positioning of said lever means to one or the other of said two positions according to further sensing pin penetration of controlling holes as thence aligned therewith.

6. The combination of claim 5 in which said lever means is normally positioned at the one of said two positions; and said actuating means is effective for transferring said lever means to the other of said two positions under control of at least one further sensing pin when not having aligned ones of the controlling holes for penetration thereby.

7. The combination of claim 5 in which said lever means is normally positioned at the one of said two positions; each of said matrix plates is provided with a predetermined pattern of further controlling holes therethrough; and said actuating means includes a pair of further sensing pins operably associated with said matrix plates and effective for transferring said lever means to the other of said two positions whenever not having aligned ones of said further controlling holes for duo penetration thereby.

8. The combination of claim 6 in which said control arm means includes first and second arm members interconnecting the respective one and other sensing pins of said selected pair thereof; resilient means normally effective for positioning said lever means to said one position and said first arm member for presenting said one sensing pin effective for penetrating controlling holes when aligned therewith; arm member coordinate means; said coordinate means being effective under control of said lever means while at said one position for positioning said second arm member for presenting said other sensing pin then ineffective for penetrating controlling holes when aligned therewith; transfer means effective under control of said lever means when transferred to said second position for positioning said second arm member for presenting said other sensing pin effective for penetrating controlling holes when aligned therewith; and said coordinate means becoming effective under control of said second arm member when so positioned by said lever means when transferred to said second position for overcoming said resilient means and positioning said first arm member for presenting said one sensing pin then ineffective for penetrating controlling holes when aligned therewith.

9. The combination of claim 8 in which said resilient means comprises a spring member tensioned between said lever means and said first arm member; said transfer means comprises a link member connected between said lever means and said second arm member; and said coordinate means comprises an abutment on said second arm member aligned for operating engagement by said lever means while at said one position under control of said resilient means and aligned for operating engagement with said first arm member during transfer means positioning of said second arm member under control of said lever means when transferred to said second position.

10. The combination of claim 9 in which said link member is a non-tensioned spring member of a magnitude greater than that of said tensioned spring member.

11. The combination of claim 6 in which said control arm means includes first and second arm members interconnecting the respective one and other sensing pins of said selected pair thereof; resilient means normally effective for positioning said lever means to said one position and said first arm member for presenting said one sensing pin effective for penetrating controlling holes when aligned therewith; coordinate means between said first and second arm members; said coordinate means being effective under control of said first arm member while so positioned by said resilient means for positioning said second arm member for presenting said other sensing pin then ineffective for penetrating controlling holes when aligned therewith; transfer means effective under control of said lever means when transferred to said second position for positioning said second arm member for presenting said other sensing pin effective for penetrating controlling holes when aligned therewith; and said coordinate means becomming effective under control of said second arm member when so positioned by said lever means when transferred to said second position for overcoming said resilient means and positioning said first arm member for presenting said one sensing pin then ineffective for penetrating controlling holes when aligned therewith.

12. The combination of claim 11 in which said resilient means comprises a spring member tensioned between said lever means and said first arm member; said transfer means comprises a link member connected between said lever means and said second arm member; and said coordinate means comprises an abutment on said second arm member aligned for operating engagement both by said first arm member while at said one position under control of said resilient means and with said first arm member during transfer means positioning of said second arm member under control of said lever means when transferred to said second position.

13. The combination of claim 12 in which said link member is a non-tensioned spring member of a magnitude greater than that of said tensioned spring member.

14. The combination of claim 6 in which said control arm means includes first and second arm members interconnecting the respective one and other sensing pins of said selected pair thereof; resilient means normally effective for positioning said lever means to said one position and said first arm member for presenting said one sensing pin effective for penetrating controlling holes when aligned therewith; link means effective under control of said lever means while at said one position for positioning said second arm member for presenting said other sensing pin then ineffective for penetrating controlling holes when aligned therewith, and effective under control of said lever means when transferred to said second position for positioning said second arm member for presenting said other sensing pin effective for penetrating controlling holes when aligned therewith; and abutment means under control of said second arm member when so positioned by said lever means when transferred to said second position for overcoming said resilient means and positioning said first arm member for presenting said one sensing pin then ineffective for penetrating controlling holes when aligned therewith.

15. The combination of claim 14 in which said resilient means comprises a spring member tensioned between said lever means and said first arm member; said link means comprises a non-tensioned spring member connected between said lever means and said second arm member; and said abutment means comprises a stud member on said second arm member aligned for operating engagement with said first arm member during link means positioning of said second arm member under control of said lever means when transferred to said second position.

References Cited

UNITED STATES PATENTS

| | | | |
|---|---|---|---|
| 2,755,993 | 7/1956 | Christian et al. | 235—60.48 |
| 2,904,070 | 9/1959 | Lynott | 235—201 |
| 3,072,325 | 1/1963 | Köhler et al. | 235—60.47 |
| 3,074,628 | 1/1963 | Gille et al. | 235—60.47 |
| 3,270,958 | 9/1966 | Hickerson | 235—61 |

RICHARD B. WILKINSON, Primary Examiner

STANLEY A. WAL, Assistant Examiner

U.S. Cl. X.R.

235—62